Feb. 2, 1932.　　　A. J. BAKER　　　1,843,594
BRAKE FOR MOTOR VEHICLES
Original Filed Jan. 19, 1924　　3 Sheets-Sheet 1
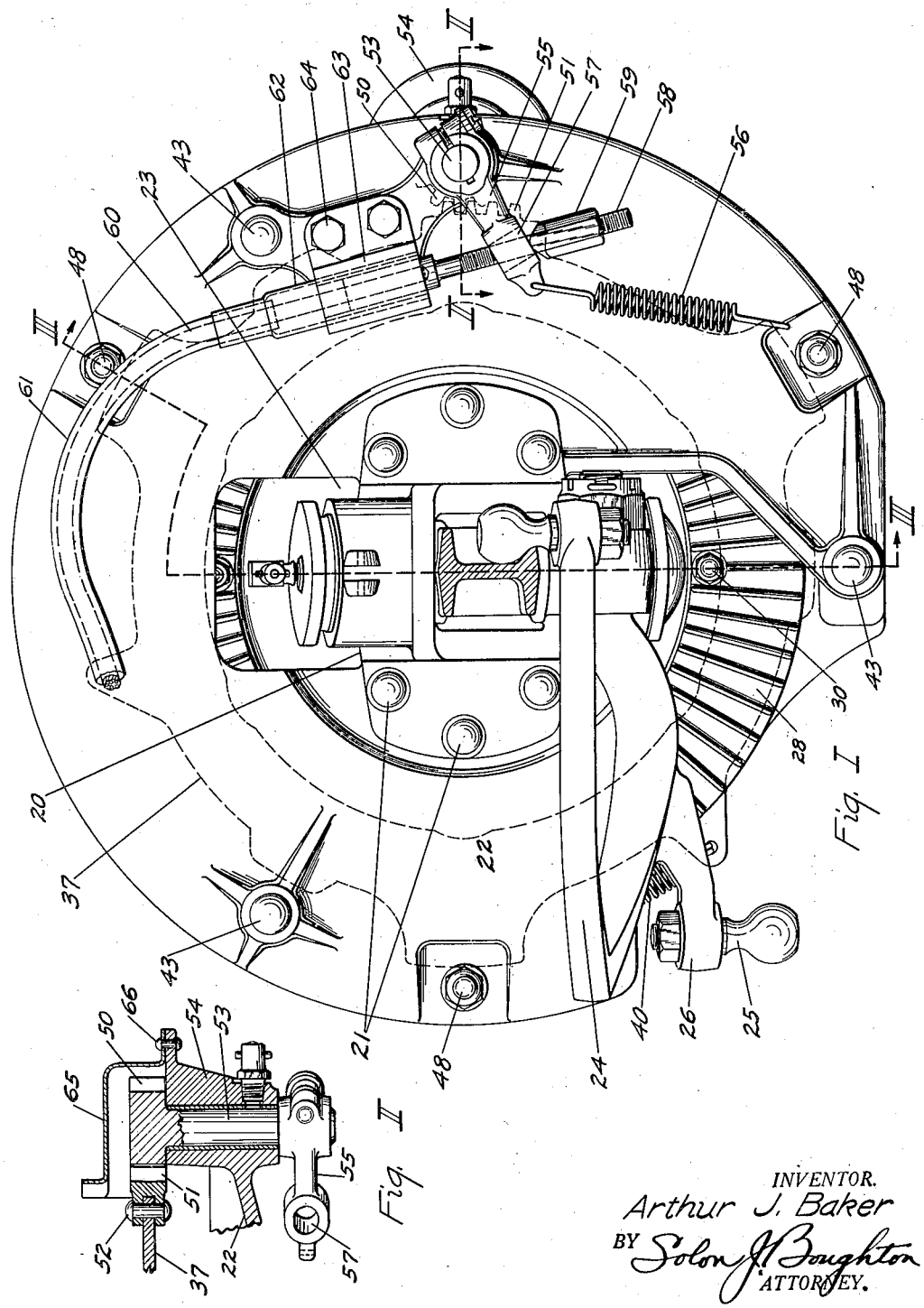
INVENTOR.
Arthur J. Baker
BY Solon J. Boughton
ATTORNEY.

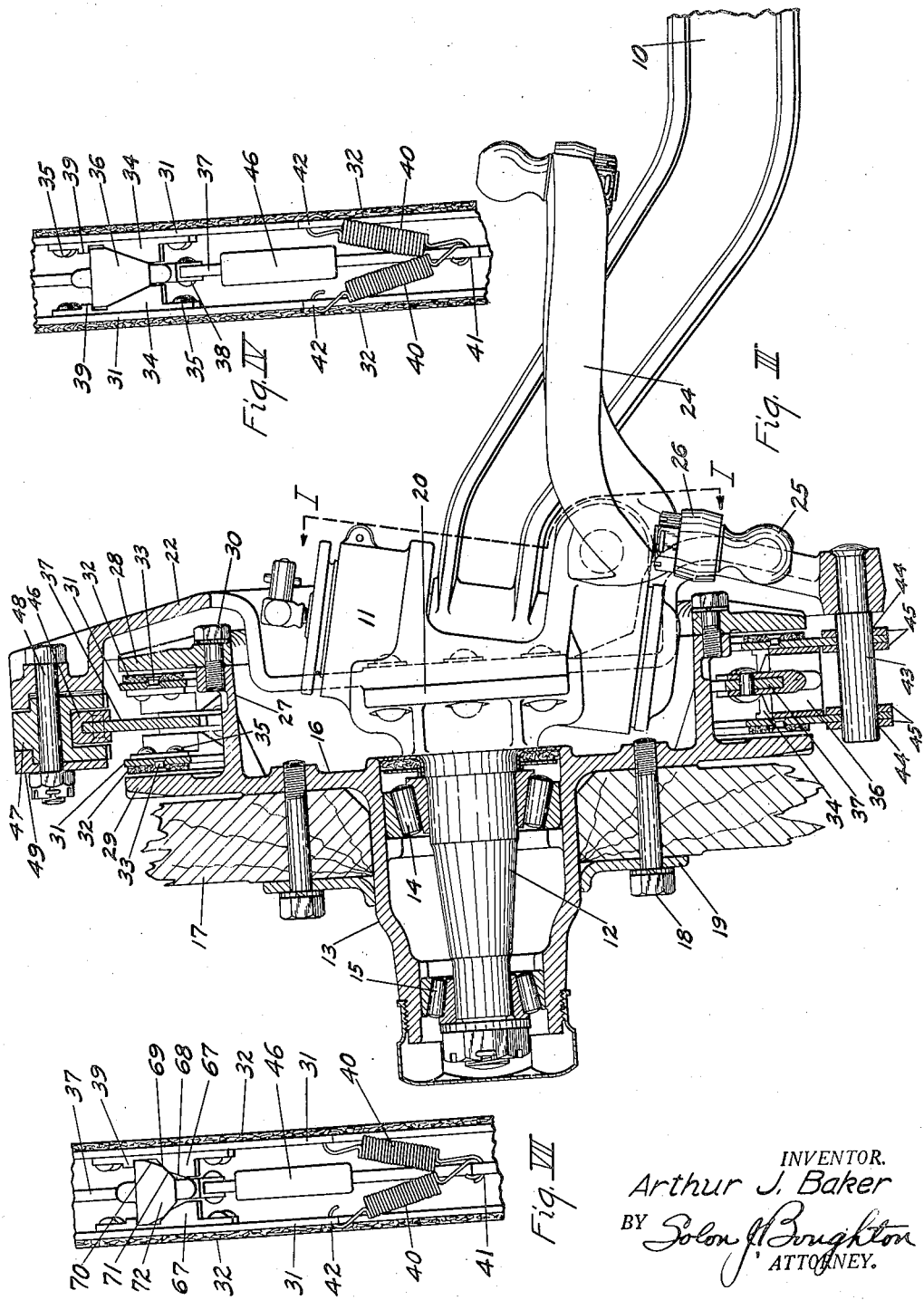

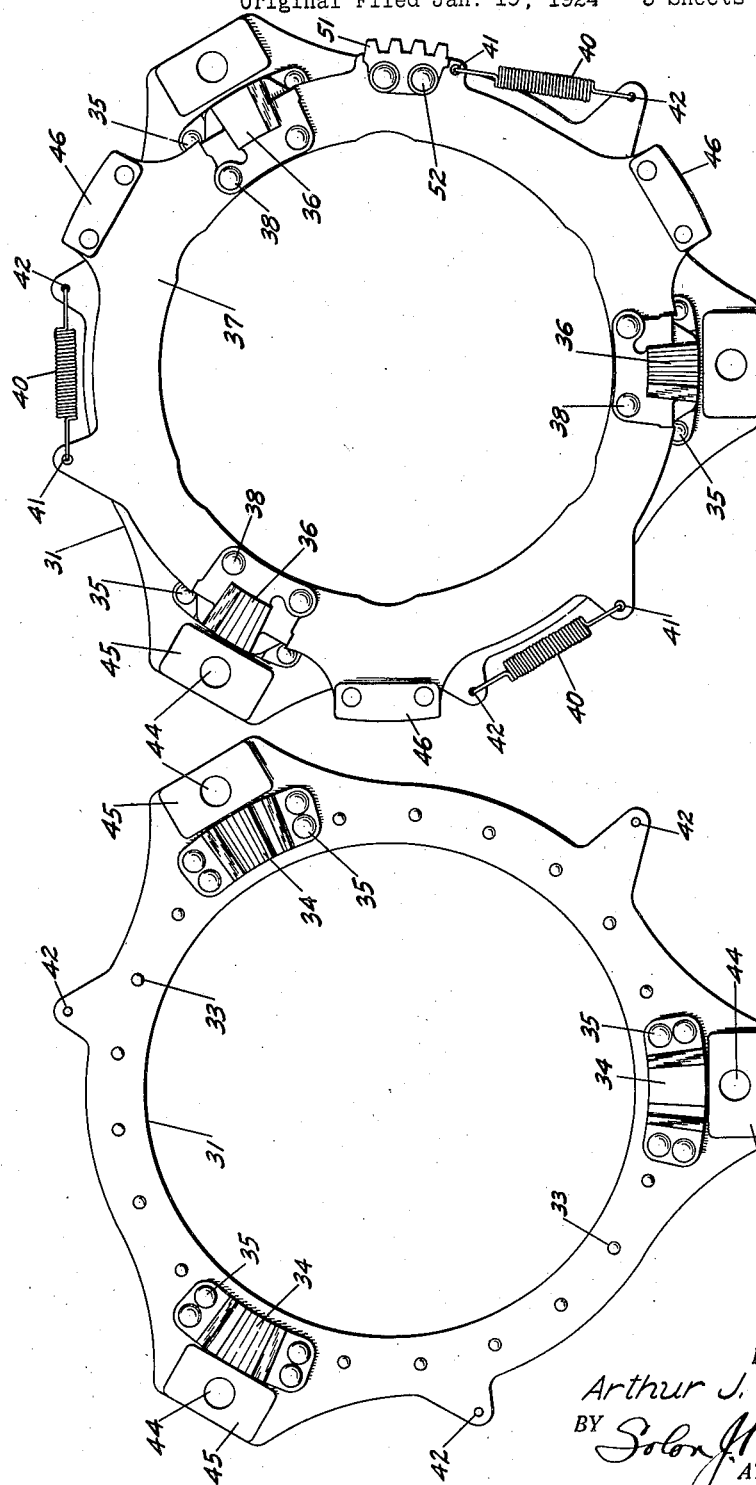

Patented Feb. 2, 1932

1,843,594

UNITED STATES PATENT OFFICE

ARTHUR J. BAKER, OF TOLEDO, OHIO, ASSIGNOR TO BENDIX BRAKE COMPANY, OF CHICAGO, ILLINOIS, A CORPORATION OF ILLINOIS

BRAKE FOR MOTOR VEHICLES

Application filed January 19, 1924, Serial No. 687,273. Renewed June 30, 1930.

This invention relates to brakes for motor vehicles, and has for one object to provide a brake suitable for application both to the front and rear wheels of the vehicle, but particularly adapted for use with the front or steering wheels, and so constructed as to avoid the locking of the brakes upon said wheels, thereby overcoming the dangers incident to such an operation.

Another object of the invention is to provide an improved brake of the axially movable disc or ring type, constructed so as to avoid locking under practically all operating conditions, as distinguished from the band brake, in which there is a tendency of the band to wrap about the drum and to become locked thereon.

A further object of the invention is to provide a wheel brake constructed in such a manner as to equalize the thrust of the brake upon the bearings of the wheel, by producing equal thrust in opposite directions.

A further object of the invention is to provide a brake for the front or steering wheels, constructed so that all parts of the brake are adapted to move with the wheel about the pivotal axis thereof, the operation or release of the brakes being as readily effected for one position of the wheel, as for another.

A further object of the invention is to provide a wheel brake with a revoluble cam ring between two or more axially movable braking elements, arranged to be moved by the cam ring into engagement with separate braking surfaces or flanges connected with the wheel to rotate therewith.

A further object of the invention is to so construct the brake that when the pressure is applied to the brake pedal, a relatively quick movement will be imparted to the braking elements, and as the pedal continues to be depressed, the speed of the moving elements will be reduced, whereby to effect a gradual application of the brakes.

Other objects will appear from the description to follow, covering certain embodiments of the invention, which, for the purposes of the present application, I have illustrated in the accompanying drawings, in which:

Figure I is a vertical section of a brake embodying one form of the invention, the section being taken on the line I—I of Fig III.

Fig. II is a sectional plan taken on line II—II of Fig. I, illustrating the operating gear connection for the cam ring, which effects application of the brakes.

Fig. III is a transverse sectional elevation, taken on line III—III of Fig. I.

Fig. IV is a fragmentary plan illustrating the brake rings with the cam or spreading ring therebetween, the rings being shown in normal inoperative position.

Fig. V is a detail side elevation of one of the brake rings, looking at the side nearest the cam ring.

Fig. VI is a side elevation of the cam ring shown connected to one of the brake rings by the springs for returning the cam ring to normal inoperative position, and Fig. VII is a view similar to Fig. IV showing a modified form of cam construction for spreading the brake rings apart.

In the design of front wheel brakes, it is necessary to consider the problems of steering and the effect thereon of the locking and skidding of the wheels. It is well-known that the locking of the steering wheels seriously interferes with the proper steering of the vehicle. The dangers are increased where the outer wheel becomes locked during the turning movement, since it moves faster than the inner wheel. This wheel therefore has a greater directing power than the inner wheel, and any type of brake which tends to lock the same when applied, will increase the dangers of operation. Since each front wheel assumes this position from time to time, the brakes must be so designed that neither wheel will become locked when the brakes are applied. In a band brake, the gripping and wrapping action of the band tends to cause it to hold fast to the drum, resulting at times in the locking of the wheels, which, as stated above, seriously interferes with the steering of the vehicle. The present brake has been designed to avoid this difficulty, by employing braking elements which are not subjected to a wrapping action, and which lack the gripping characteristic of the band. Such a construction consists preferably of one or more brake rings or other suitable friction producing elements adapted to be moved axially of the wheel by a suitable operating member, such as a cam ring located adjacent to or between the brake rings, the cam ring serving to move the brake elements into engagement with one or more pressure plates located on and rotating with the wheel. A brake of this kind is instantly released as soon as the pressure is relieved, since there is no tendency for it to become locked in braking position.

In the drawings, I have shown a front axle 10 including a steering knuckle 11 and spindle 12. The wheel hub 13 is provided with the usual inner and outer bearings 14 and 15, the hub having a flanged portion 16 to which the spokes 17 are secured by bolts 18 projected through a clamping flange 19, as shown in Fig. III.

The steering knuckle is provided with laterally extending arms 20, to which is connected, as by means of the rivets 21, a brake support 22, preferably in the form of a disc or spider having a central opening 23 through which the knuckle projects. The lower left hand portion of the brake support, as viewed in Fig. I, is cut away to provide clearance for the steering knuckle operating arm 24 and the cross-tie for the knuckles (not shown), arranged to be connected with the ball-shaped head of the bolt 25 secured to the auxiliary arm 26, as indicated in Fig. I.

The flanged portion 16 of the hub is provided with a cylindrical extension 27 carrying the inner and outer pressure plates 28 and 29, the latter being integral with the extension and the former being ring-shaped and secured thereto by means of the studs 30, as shown in Fig. III. The inner faces of the plates 28 and 29 constitute the braking surfaces carried by the wheel and are adapted to rotate therewith, since they are rigidly connected thereto. Mounted adjacent said surfaces are the inner and outer braking elements, preferably in the form of rings and comprising in each case, the metal sections 31 and the brake lining sections 32 constructed of any suitable material and secured to the metal sections by the rivets 33, as indicated in Fig. III. The brake rings 31 are provided with a plurality of sets of cams 34 connected to the rings by means of the rivets 35. The cams 34 are provided with oppositely inclined faces engaged by a cam 36, preferably wedge-shaped, as indicated in Fig. IV. The several cams 36 are secured upon the periphery of a cam ring 37 by rivets 38, as shown in Figs. IV and VI, and the back end of the cam 36 is adapted to rest against the shoulders 39 of the cam members 34, as shown in Fig. IV. The shoulders form stops to limit the movement of the cam ring 37 when the brake ring is returned to normal position by the springs 40, each of which has one end connected with the cam ring 37 at the point indicated by the numeral 41 in Figs. IV and VI. The other ends of the springs are connected with the brake rings 31 at the points 42, as shown in Fig. IV. The springs 40 also serve to pull the brake rings toward each other and out of contact with the pressure plates 28 and 29 when returning the cam ring 37 to normal position. The brake rings 31 are supported for movement axially of the wheel spindle by the pins 43, anchored upon the brake supporting disc 22, and projected through openings 44 in the rings, so that the latter are free to slide on the pins when forced apart by the cams or wedges 36 upon rotation of the cam ring 37. The brake rings 31, at the points where the pins 43 pass therethrough, are provided with reinforcing plates 45 which increase the bearing surfaces for the pins and which are preferably spot-welded to the brake rings.

Secured upon the periphery of the cam ring 37, are a plurality of bearing members 46 disposed in the grooved holding members 47, which form supporting and guiding means for the cam ring and permit it to be revolved freely about the axis of the spindle. The members 47 are preferably made of fiber or other non-metallic material, in order to render the operation of the brake relatively noiseless. The holders are secured upon the disc or support 22 by the bolts 48, extended through the holders and through the metal clamping plates 49, as shown in Fig. III.

Rotation of the cam ring 37 to effect application of the brakes, is accomplished by means of a gear 50 meshing with a toothed segment 51 secured to the ring by rivets 52, as shown in Figs. II and VI. The gear is carried on the end of a shaft 53 journaled in a bearing portion 54, preferably cast integral with the disc 22. An operating arm 55 is removably clamped upon the inner end of the shaft 53, and is held in normal inoperative position by a spring 56, as indicated in Fig. I. The arm is provided with an enlarged opening 57 through which is loosely extended an operating bolt 58 having threaded thereon a nut 59 engaging the lower side of the arm. The bolt is secured to a suitable operating connection which may be a cable 60 enclosed in a casing 61. Adjacent the operating arm 55 and at such other points as may be desirable, the cable is provided with a sleeve-like holder 62 mounted in a bracket 63 secured, in the present case, to the disc 22 by the bolts or studs 64. Slack in the cable may be taken up by adjustment of the nut 59 when desired. The cable may be extended from one of the front wheel brakes to the other and provided with any suitable operating means for equalizing the pull thereon, such as a pulley on a movable arm or lever (not shown).

Movement of the brake rings in opposite directions, through rotation of the cam ring, serves to equalize the pressure of the brake on the wheel and therefore equalizes the thrust on the bearings of the wheel.

The cam ring operating gear is provided with a guard 65 secured to the portion 54 of the disc 22 by means of the rivets 66.

In the modification shown in Fig. VII, the construction of the operating cams is such that on the initial depression of the brake pedal, a relatively quick spreading movement of the cam rings is effected, which is subsequently reduced to effect a gradual application of the brakes, whereby to avoid a sudden or abrupt checking of the movement of the wheels. Such a construction comprises the cam member 67 secured to the brake rings 31 and having inclined surfaces 68 and 69 with which co-operate correspondingly inclined surfaces 70 and 71 respectively, on the wedge or cam member 27, which is suitably connected with the operating ring 37. With this arrangement, the inclined surfaces 71 of the wedge, normally engage the inclined surfaces 69 of the cam member 67. When the brake pedal is first depressed, these surfaces, by reason of their inclination, act to quickly spread the brake rings, and when the surfaces 70 of the wedge come in contact with the surfaces 68 of the cam members, a more gradual movement of the brake rings will be effected, since the inclination of these surfaces is considerably less than that of the surfaces 69 and 71. It will be understood, of course, that the inclination of the several cam surfaces may be varied according to the results desired.

While I have shown the brake applied to the front wheels of a motor vehicle, it will be understood that the same may be readily applied to the rear wheels, in which case the spider or brake supporting disc will be mounted on the rear axle housing.

While I have shown and described in considerable detail, a specific embodiment of my invention, it is to be understood that this showing and description are illustrative only and for the purpose of rendering the invention more clear, and that I do not regard the invention as limited to the details of construction illustrated and described, except insofar as I have included such limitations within the terms of the following claims.

I claim as my invention:

1. In a motor vehicle, the combination with a wheel and axle and a brake support connected with the axle, of a cam ring mounted upon said support, a member secured to the wheel and having brake receiving portions upon opposite sides of the ring, a braking element for each of said brake receiving portions adapted to be moved into engagement with the latter upon movement of the ring, gear teeth upon the periphery of said ring and a gear rotatably mounted on said support and engaging said teeth for revolving the ring.

2. In a motor vehicle, the combination with a wheel and axle and a brake support connected with the axle, of a cam ring mounted upon said support, a member upon the wheel having brake receiving portions on the opposite sides of the ring, axially movable brake rings upon the opposite sides of said cam ring adapted to be forced into engagement with said brake receiving portions upon movement of the cam ring in one direction, gear teeth upon the periphery of said ring, and a gear wheel engaging said teeth for revolving the ring, said gear wheel being journaled in said support.

3. In a motor vehicle, the combination with a wheel and axle and a brake support connected with the axle, of a brake actuating ring mounted upon said support, a member upon the wheel having brake receiving portions upon the opposite sides of said ring, axially movable brake rings on the opposite sides of said actuating ring, co-operating cams upon said actuating ring and said brake rings, whereby the latter are forced into engagement with said brake receiving portions, gear teeth upon the periphery of said ring, and a gear wheel journaled in said support and engaging said teeth for revolving the ring.

4. In a motor vehicle, the combination with a wheel and axle and a brake support connected with the axle, of grooved guide members upon said support, an actuating ring rotatably mounted within said guide members and peripherally supported thereby against radial and lateral displacement, a members upon the wheel having brake receiving portions upon the opposite sides of said actuating ring, co-operating cams upon said actuating ring and said brake rings, whereby the latter are forced into engagement with said brake receiving portions, operating means for said actuating ring, and means for returning said rings to normal position when the braking pressure is released.

5. In a motor vehicle, the combination with a wheel and axle and a brake support connected with the axle, of a cam ring revolubly mounted upon said support, a member upon the wheel having brake receiving portions upon the opposite sides of said ring, a brake element for each of said brake receiving portions adapted to be moved into engagement with the latter upon rotation of said cam ring, a gear operatively connected with said cam ring, and means for actuating the gear to effect rotation of said cam ring.

6. In a motor vehicle, the combination with a wheel and axle and a brake support connected with the axle, of a plurality of spaced grooved guides mounted on said support, a cam ring revolubly mounted in said guides and peripherally supported thereby against radial and lateral displacement, a member upon the wheel having brake receiving portions adapted to be moved into engagement with the latter upon rotation of said cam ring, operating means for said cam ring, and springs for returning said braking elements to normal position when the braking pressure is released.

7. In a motor vehicle, the combination with a wheel and axle and a brake support connected with the axle, of a brake actuating ring, spaced members upon said support forming retaining and guiding means for said ring, a member upon the wheel having brake receiving portions upon the opposite sides of the ring, braking elements upon the opposite sides of the ring adapted to be moved into engagement with said brake receiving portions, co-operating cams upon said ring and braking elements whereby to effect application of the braking elements, means yieldingly connecting the ring with the braking elements to normally hold the latter in a predetermined position upon the ring, and means for actuating the ring.

8. In a motor vehicle, the combination with a wheel and axle and a brake support connected with the axle, of a brake actuating cam ring, spaced members upon said support forming retaining and guiding means for said ring, a member upon the wheel having a brake receiving portion, a non-rotatable brake element mounted adjacent said cam ring and adapted to be moved thereby into engagement with said brake receiving portion, pins carried by the support upon which said brake element is adapted to slide, and means for actuating said ring.

9. In a motor vehicle, the combination with a wheel and axle and a pressure plate upon the wheel, of a brake support connected with the axle, including spaced members having grooves formed thereon, a vertically disposed cam ring loosely held by said members within said grooves, a brake element adapted to be moved into engagement with said pressure plate by said cam ring, and means for actuating said cam ring.

10. In a motor vehicle, the combination with a wheel and axle and a pressure plate upon the wheel, of a brake support connected with the axle, grooved guide members upon said support, a cam ring revolubly guided by said support through contact of peripheral portions of the ring with the bottom of said grooves, a brake element adapted to be moved by the ring into engagement with said pressure plate, and means for revolving the ring.

11. In a motor vehicle, the combination with a wheel and axle and a pressure plate upon the wheel, of a brake support connected with the axle, a cam ring revolubly held by said support through contact of peripheral portions of the ring, a brake element adapted to be moved by the ring into engagement with said pressure plate, teeth formed upon the ring, a gear meshing with said teeth, and means for actuating the gear to revolve the ring, whereby to force said brake element into engagement with said pressure plate.

12. In a motor vehicle, the combination with a wheel and axle and a pressure plate upon the wheel, of a brake support connected with the axle, a cam ring revolubly held by said support through contact of peripheral portions of the ring therewith, a brake ring adapted to be moved by the cam ring into engagement with said pressure plate, and means for revolving said cam ring upon said support.

13. In a motor vehicle, the combination with a wheel and axle and a pressure plate upon the wheel, of a brake support connected with the axle, a cam ring revolubly held by said support through contact of peripheral portions of the ring therewith, an axially movable brake ring carried by said support and adapted to be moved by the cam ring into engagement with said pressure plate, and means for revolving said cam ring upon said support.

14. In a motor vehicle, the combination with a wheel and axle and a pair of pressure plates connected with the wheel, of a support connected with the axle, spaced brake rings mounted between said pressure plates, an intermediate ring disposed between said brake rings and revoluble in guides mounted upon said support, said guides comprising groove shaped members embracing said ring and radially supporting the same, oppositely positioned cams carried by said brake rings, a wedge upon said intermediate ring disposed between said cams, means for revolving said intermediate ring upon the support to cause said wedge to ride upon said cams, whereby to force the brake rings into engagement with said pressure plates, and springs connected with the intermediate ring and adapted to rotate the same back to normal position when the braking pressure is released.

15. In a motor vehicle, the combination with a wheel and axle and a pressure plate upon the wheel, of a disc connected with the axle in spaced relation to the wheel, a plurality of grooved members removably connected with the disc, a ring supported by said members and revoluble within said grooves, a brake element adapted to be moved by the ring into engagement with said pressure plate, and means for revolving said ring.

16. In a motor vehicle, the combination with a wheel and axle and a pressure plate upon the wheel, of a disc connected with the axle in spaced relation to the wheel, a plurality of grooved members removably connected with the disc, a ring supported by said members and revoluble within said grooves, a brake element adapted to be moved by the ring into engagement with said pressure plate, teeth carried by the ring, a gear meshing with said teeth, and means for actuating the gear to effect rotation of the ring whereby to move said brake element into engagement with said pressure plate.

17. In a motor vehicle, the combination with a wheel and axle and a pressure plate upon the wheel, of a disc connected with the axle in spaced relation to the wheel, a ring mounted to revolve upon said disc, a brake element adapted to be moved by the ring into engagement with said pressure plate, a shaft journaled upon the disc, a gear upon said shaft operatively connected with the ring, an arm connected with the shaft, a cable operatively connected with the arm, and a spring connected with the arm adapted to return the parts to normal position when the pull on the cable is released.

18. In a motor vehicle, the combination with a wheel and axle and a brake support connected with the axle, of a cam ring revolubly mounted upon said support, a member carried by the wheel and having a brake receiving portion projected through said ring, a braking element mounted adjacent said brake receiving portion and adapted to be moved into frictional engagement therewith by said cam ring upon rotation of the latter, and means for revolving said ring.

19. In a motor vehicle, the combination with a wheel and axle and a brake support connected with the axle, of a ring revolubly mounted upon said support, a member carried by the wheel and having a brake receiving portion projecting through said ring, a braking element mounted adjacent said ring, cooperating cams upon the ring and braking element adapted to force the latter into engagement with said brake receiving portion upon rotation of the ring, and means for revolving said ring about the axis of the wheel.

20. In a motor vehicle, the combination with a wheel and an axle including a steering knuckle and a spindle for the wheel, of a support carried by the steering knuckle, a member upon the wheel having braking surfaces thereon, braking devices mounted upon the support for movement in opposite directions and axially into engagement with said braking surfaces, and operating means for said braking devices mounted upon the support.

21. In a motor vehicle, the combination with a wheel and axle including a steering knuckle and a spindle for the wheel, of a support carried by the steering knuckle, spaced pressure plates carried by the wheel, braking devices mounted between said pressure plates for movement in opposite directions and axially into engagement with the pressure plates, a cam ring mounted upon the support between said braking devices, and means for actuating said cam ring to effect movement of the braking devices.

22. In a motor vehicle, the combination with a wheel and axle and a member upon the wheel having a braking surface thereon, of a support upon the axle, a braking element upon the support adapted to be moved axially into engagement with said braking surface, and means for moving said element at different speeds while advancing it into engagement with said surface.

23. In a motor vehicle, the combination with a wheel and axle and a member mounted upon the wheel having a braking surface thereon, of a support upon the axle, a braking element upon the support, and actuating means for said braking element adapted to effect a relatively quick movement thereof during initial operation and subsequently producing a slower movement of said element as it moves into closer contact with said braking surface.

24. In a motor vehicle, the combination with a wheel and axle and a member mounted upon the wheel having a braking surface thereon, of a support upon the axle, an axially movable braking element carried by said support, and means for moving said element into engagement with said braking surface and simultaneously varying its speed during said movement.

25. In a motor vehicle, the combination with a wheel and axle and a member mounted upon the wheel and having a braking surface thereon, of a support upon the axle, an axially movable braking element carried by said support, an actuating cam for moving said braking element into engagement with said braking surface and simultaneously varying its speed during said movement, and operating means for said cam.

26. In a motor vehicle, the combination with a wheel and axle and a member mounted upon the wheel and having braking surfaces thereon, of a support upon the axle, braking devices carried by the support, a cam constructed to move said devices in opposite directions whereby to cause them to engage said braking surfaces, said cam and the portions of said devices engaged thereby being adapted to vary the speed of the devices during operation, and means for actuating the cam.

27. In a motor vehicle, the combination with a wheel and axle and a member mounted upon the wheel having braking surfaces thereon, of a support upon the axle, axially movable brake rings carried by the support, an operating ring carried by the support, cams carried by said brake rings, each having adjacent relatively inclined operating faces, a cam member carried by said operating ring having adjacent relatively inclined operating faces, and means for actuating said operating ring to cause the relatively inclined faces of the cam member thereon to engage the relatively inclined faces of the cams on the brake rings, whereby to vary the speed of movement of the rings during operation.

28. In a motor vehicle, the combination with a wheel and axle and a member mounted upon the wheel and having braking surfaces thereon, of a support upon the axle, relatively movable brake elements carried by the support, and actuating means for said elements including members having co-operating cam faces, certain of which are adapted to reach operating position subsequent to the others thereof.

29. In a motor vehicle, the combination with a wheel and axle and a member mounted upon the wheel having braking surfaces thereon of a support upon the axle, relatively movable brake elements carried by the support, a flexible actuating device for said brake elements capable of a limited amount of distortion whereby it will insure the application of both of said braking elements, and operating means for said actuating device.

30. In a motor vehicle, the combination with a wheel and axle and a member mounted upon the wheel having braking surfaces thereon, of a support upon the axle, relatively movable brake elements carried by the support, a flexible actuating cam ring 37 for said brake elements capable of a limited amount of distortion whereby it will insure the application of both of said braking elements, and operating means for said ring.

31. In a vehicle brake, the combination with a vehicle wheel, of a brake drum mounted fast thereupon, having spaced disk walls, a pair of annular brake shoes within said drum and respectively engageable with said walls, means restraining said shoes from rotation, a cam member rotatable between said brake shoes co-axially with the wheel, said member having gear teeth, a pinion engaging said teeth to rock the cam, and means for rocking said pinion.

32. In a vehicle brake, the combination with a wheel and a disk brake member carried by and rotatable with said wheel, of a coacting disk brake member slidable to and from the first-mentioned brake member, means restraining the sliding brake member from rotation, a cam rotatable coaxially of said wheel for forcing the sliding brake member toward the brake member carried by the wheel, and means carried by the sliding brake member engageable with said cam member to limit rotation of the latter.

33. In a vehicle brake, the combination with a vehicle wheel, of spaced disc brake members secured to said wheel to rotate therewith, a co-acting pair of annular brake shoes between said discs having outer portions spaced to form an annular chamber and to adapt said portions to co-act with said annular discs, means within said chamber for urging said brake shoes apart, and means engaging the inner portions of said shoes, normally disengaging the shoes from the discs.

34. A brake, including a non-rotatable part, a rotatable part, a plurality of parallel braking elements associated respectively with the parts in axial alignment, one set of elements being secured together to form a housing for the other set, and means for effecting movement of certain of the braking elements apart axially of the assembly into frictional engagement with other of the braking elements to brake the rotatable part.

35. A brake, for a swivelled wheel, including a disk adapted for frictional engagement with another portion of the brake when the brake is operated, and means for moving the disk into such engagement without being substantially affected by the swivelling of the wheel including an arcuate rack associated with the disk and a pinion meshed with the rack.

36. A brake, including a non-rotatable part having in association therewith parallel friction members movable axially of the assembly, a rotatable part having in association therewith parallel friction members enclosing the first members and adapted to be engaged by the first mentioned members to brake the rotatable part, and means to move the first mentioned members into such engagement.

In testimony whereof, I affix my signature.

ARTHUR J. BAKER.